(12) United States Patent
Haverkamp et al.

(10) Patent No.: US 11,035,696 B2
(45) Date of Patent: Jun. 15, 2021

(54) SENSOR ARRANGEMENT HAVING A MODULAR STRUCTURE INCLUDING SENSOR MOUNTED ON BEARING ELEMENT CONFIGURED TO PROJECT FROM HOUSING

(71) Applicant: Continental Teves AG & Co. oHG, Frankfurt (DE)

(72) Inventors: Martin Haverkamp, Frankfurt Am Main (DE); Manfred Goll, Glauburg (DE); Heinrich Acker, Schwalbach (DE); Henrik Antoni, Freigericht (DE); Jens Habig, Kronberg (DE); Michael Schulmeister, Groß-Zimmern (DE); Philipp Schröder, Karlsruhe (DE)

(73) Assignee: Continental Teves AG & Co. oHG

( * ) Notice: Subject to any disclaimer, the term of this patent is extended or adjusted under 35 U.S.C. 154(b) by 129 days.

(21) Appl. No.: 15/738,349

(22) PCT Filed: Jun. 15, 2016

(86) PCT No.: PCT/EP2016/063713
§ 371 (c)(1),
(2) Date: Dec. 20, 2017

(87) PCT Pub. No.: WO2017/005468
PCT Pub. Date: Jan. 12, 2017

(65) Prior Publication Data
US 2018/0172476 A1    Jun. 21, 2018

(30) Foreign Application Priority Data
Jul. 7, 2015   (DE) .................... 10 2015 212 633.1

(51) Int. Cl.
*G01D 5/14*    (2006.01)
*G01D 11/24*   (2006.01)

(52) U.S. Cl.
CPC .......... *G01D 5/145* (2013.01); *G01D 11/245* (2013.01)

(58) Field of Classification Search
CPC combination set(s) only.
See application file for complete search history.

(56) References Cited

U.S. PATENT DOCUMENTS 4,122,390 A * 10/1978 Kollitz .................. B60D 1/065
                                                        280/432
5,579,228 A    11/1996 Kimbrough et al.
(Continued)

FOREIGN PATENT DOCUMENTS

CN    102378868 A    3/2012
DE    19733719 C1    4/1999
(Continued)

OTHER PUBLICATIONS

International Search Report and Written Opinion for International Application No. PCT/EP2016/063713, dated Aug. 10, 2016, 9 pages.
(Continued)

*Primary Examiner* — Jay Patidar
(74) *Attorney, Agent, or Firm* — RatnerPrestia

(57) ABSTRACT

A sensor arrangement having: a housing, a movement sensor, the movement sensor, being mounted on a bearing element connected to the housing; a position sensor; and a position transducer, the position sensor and the position transducer being arranged relative to each other in such a way that the movement of the movement sensor can be measured. The bearing element protrudes from the housing, or the position sensor and the position transducer are eccentric relative to the bearing element.

8 Claims, 5 Drawing Sheets

(56) References Cited

U.S. PATENT DOCUMENTS

| | | | |
|---|---|---|---|
| 6,976,394 B2 | 12/2005 | Kleinen et al. | |
| 8,760,152 B2 | 6/2014 | Uhlenbruck | |
| 2006/0006861 A1* | 1/2006 | Heinze | G01D 5/145 |
| | | | 324/207.21 |
| 2006/0071448 A1* | 4/2006 | Craig | B60D 1/06 |
| | | | 280/511 |
| 2007/0187980 A1 | 8/2007 | Jahn et al. | |
| 2008/0284421 A1* | 11/2008 | Hatanaka | G01D 5/04 |
| | | | 324/207.25 |
| 2012/0025810 A1* | 2/2012 | Uhlenbruck | F16H 59/044 |
| | | | 324/207.2 |
| 2014/0047913 A1* | 2/2014 | Waite | G01M 17/04 |
| | | | 73/117.01 |
| 2015/0177025 A1* | 6/2015 | Mizunuma | G01D 5/14 |
| | | | 324/207.25 |
| 2015/0338242 A1 | 11/2015 | Sticksel et al. | |
| 2017/0276511 A1* | 9/2017 | Kotlaja | G01D 5/145 |

FOREIGN PATENT DOCUMENTS

| | | |
|---|---|---|
| DE | 19810378 A1 | 9/1999 |
| DE | 10334000 A1 | 2/2005 |
| DE | 102005045195 A1 | 4/2006 |
| DE | 102007034099 A1 | 1/2009 |
| DE | 102013219018 A1 | 6/2014 |
| DE | 102013213663 A1 | 1/2015 |
| EP | 0943469 A2 | 9/1999 |
| EP | 1376077 A2 | 1/2004 |
| EP | 2644921 A1 | 10/2013 |
| WO | WO-2013086551 A1 * | 6/2013 ............. H03K 17/97 |

OTHER PUBLICATIONS

German Search Report for German Application No. 10 2015 212 633.1, dated Jan. 26, 2016, including partial English translation, 8 pages.

Notice of Proceeding with Registration Formalities and Notice of Granting a Patent Right for Invention for Chinese Application No. 201680036627.X, dated May 11, 2020 with translation, 6 pages.

Chinese Office Action for Chinese Application No. 201680036627.X, dated Aug. 28, 2019, 11 pages.

* cited by examiner

SENSOR ARRANGEMENT HAVING A MODULAR STRUCTURE INCLUDING SENSOR MOUNTED ON BEARING ELEMENT CONFIGURED TO PROJECT FROM HOUSING

CROSS REFERENCE TO RELATED APPLICATIONS

This application is the U.S. National Phase Application of PCT International Application No. PCT/EP2016/063713, filed Jun. 15, 2016, which claims priority to German Patent Application No. 10 2015 212 633.1, filed Jul. 7, 2015, the contents of such applications being incorporated by reference herein.

FIELD OF THE INVENTION

The invention relates to a sensor arrangement according to the preamble of the independent claims.

BACKGROUND OF THE INVENTION

FIG. 1a shows a sensor arrangement 1 known from the prior art. Such sensor arrangements are used, for example, when the displacement of a component of a vehicle is to be detected. The sensor arrangement 1 comprises a displaceable coupling rod 2 which is capable of being coupled to a motor vehicle running gear, for example, in order to detect a displacement of a motor vehicle running gear (not illustrated). However, it would be likewise conceivable for the displaceable coupling rod 2 to be coupled to a body, a headlamp, a motor vehicle axle, or another vehicle component. The sensor arrangement furthermore comprises a coupling joint 3 and a movement sensor 8. The sensor arrangement furthermore comprises a housing 4, a bearing element in the form of a shaft (not to be seen in the drawing), and a position transducer and a position sensor which are mutually disposed in such a manner that the movement of the movement sensor 8 is measurable.

The coupling rod is coupled to the movement sensor 8 by way of the coupling joint 3. The coupling rod 2 is moved and the coupled movement sensor 8 is rotated about an angle on account of a displacement of the motor vehicle running gear, said angle being detected by the sensor arrangement 1. To this end, the movement sensor 8 comprises the bearing element in the form of the shaft which is mounted in the housing 4 as a friction bearing and which at the free end thereof includes the position transducer, said shaft as a consequence of the rotating movement of the movement sensor 8 rotating about its own longitudinal axis. The coupling rod 2 and the movement sensor 8 are embodied so as to be elongate and dimensionally rigid so as to guarantee a precise transmission or translation, respectively, of the displacement to be detected to a point that is suitable for the detection. The position transducer is configured as a magnetic encoder which rotates conjointly with the shaft. The angle of rotation of the magnetic encoder is detected by the position sensor, in the form of a Hall sensor, that is integrated in the housing 4.

FIG. 1b shows the shaft forming the bearing element 5, having the position transducer 11, and the position sensor 10 of the sensor arrangement 1 from FIG. 1a, released from the housing 4. The position transducer 11 herein is embodied as a magnetic encoder having a permanent-magnetic separation in the form of a pole pair and is fastened to the end of the shaft. The position sensor 10 is a Hall sensor which is perfused by current and, depending on the direction of the magnetic field of the magnetic encoder, emits a Hall voltage, the angle of rotation of the position transducer 11 and thus of the shaft being derived from the evaluation of said Hall voltage.

This sensor arrangement has the disadvantage that the shaft that is routed through the housing has to be sealed toward the outside since leakages lead to the ingress of moisture and compromise the functioning of the sensor arrangement. The same could also be caused by wear to the shaft mounting. Moreover, the assembly of a magnetic transducer element on a steel shaft is very complex by virtue of the dissimilar coefficients of thermal expansion.

A further disadvantage lies in that the replacement of individual components of the angle sensor arrangement can only be realized at high costs in the case of an integrated arrangement of the sensor element within the housing.

SUMMARY OF THE INVENTION

Therefore an aspect of the invention aims to provide a sensor arrangement which operates in a robust manner with high precision and herein is producible in a simple and variable manner.

According to a first aspect of the invention in a sensor arrangement of the type mentioned at the outset the bearing element is configured so as to project from the housing.

A bearing element that is configured so as to project from the housing is preferably understood to mean that the bearing element is configured so as to project in relation to the interface thereof with the housing. Should the housing at other points or in other regions of the housing protrude beyond the bearing element, or should the bearing element be configured within a depression of the housing, this explicitly does not contradict the concept of aspects of the invention.

An aspect of the invention is based on the basic concept of displacing the mounting of the movement sensor or else of the shaft from the interior of the housing to the exterior. The mounting is reversed in this way, that is to say that the bearing element forms a static element of the sensor arrangement, whereas the counterpart as part of the movement sensor is movable. Apart from being capable of simple assembly, this has the advantage that the mounting is not located in the interior of the housing but outside the housing on account of which measures in terms of sealing can be dispensed with or be simplified. Moreover, additional possibilities for positioning the position transducer element and the position sensor element arise.

Preferred refinements are the subject matter of the dependent claims, of the figures, and of the description, which refinements by way of explicit reference are incorporated as the subject matter of the description.

In one advantageous embodiment the position transducer or the position sensor is connected to the bearing element, to the movement sensor, to the housing, or to a housing module.

In one advantageous embodiment the bearing element is rigidly connected to the housing. In this way, the type and the number of degrees of freedom can be defined by way of the mounting in a particularly unequivocal and simple manner.

In one advantageous embodiment the position sensor or the position transducer is integrated in the bearing element or in the housing.

In a further advantageous embodiment the position sensor or the position transducer is integrated in the movement sensor.

According to an aspect of the invention, it is not the order of the arrangement, or the assignment to either the bearing element or to the movement sensor, respectively, that is decisive herein in terms of the elements of the position sensor or the position transducer, respectively, but rather the integrated embodiment of said elements.

According to a further embodiment, the bearing element is advantageously configured as an articulated bearing element or a spherical bearing element having at least one rotation axis. On account thereof, the mounting of the movement sensor is provided such that the latter can be rotated in relation to the housing. Additional rotation axes are created by a spherical bearing element, the former ensuring additional play.

In one advantageous embodiment the sensor arrangement comprises a housing module for receiving the position sensor or the position transducer, wherein the housing module is attachable to the housing so as to be aligned on an axis, in particular a rotation axis, of the bearing element. The sensor arrangement by way of this arrangement has a particularly modular structure since the housing module together with the position sensor or the position transducer forms one unit which can be readily replaced.

The housing module is preferably configured such that said housing module intersects the at least one rotation axis of the bearing element so close to the movement sensor that an axial removal of the movement sensor from the bearing element is prevented. The housing module thus represents a security feature against the unintentional release of the movement sensor from the bearing element.

In a further advantageous embodiment the position sensor comprises a 3D sensor or a sensor that detects by way of a plurality of spatial axes, for example a 3D Hall sensor. This, in combination with a bearing element which permits a plurality of rotation axes, for example in the form of a sphere, has the advantage that angles of rotation of the movement sensor about one or a plurality of said rotation axes can also be detected by the position sensor. By contrast, in combination with a bearing element which permits substantially only one rotation axis, for example in the form of a cylinder, unintentional degrees of freedom, or rotating movements about other rotation axes, respectively, can be detected, said unintentional degrees of freedom or rotating movements occuring due to tolerances resulting from the mechanical shape of the bearing element. Moreover, the 3D sensor over a temporal profile enables the identification of one or a plurality of additional degrees of freedom, which indicates wear to the bearing element or to the mounting, respectively, and makes said wear identifiable.

In an additional advantageous embodiment, the bearing element is integrated in a holder for fastening the housing.

It is preferable for the bearing element in the region of the mounting to be configured so as to be substantially spherical or cylindrical.

In a further advantageous embodiment the movement sensor is configured as a shaft.

It is expedient for the shaft to form the rotor of an electric motor.

A further aspect of the invention comprising a sensor arrangement which has a housing, a movement sensor, wherein the movement sensor is mounted on a bearing element that is connected to the housing, a position sensor and a position transducer, and wherein the position sensor and the position transducer are mutually disposed in such a manner that the movement of the movement sensor is measurable, and wherein the position sensor and the position transducer are disposed so as to be eccentric in relation to the bearing element. It is an advantage of this sensor arrangement that there is a particularly great degree of latitude in the design of the mounting of the movement sensor on a bearing element that is connected to the housing. A modular structure and a simple assembly of the sensor arrangement are furthermore facilitated.

The position sensor being connected to the bearing element or to the housing, and the position transducer being connected to the movement sensor, or vice versa, is understood to mean that the position sensor or the position transducer, respectively, is connected directly to the respective component mentioned in an integrated or differentiated construction mode.

In this case the bearing element is preferably rigidly connected to the housing.

In one advantageous embodiment the bearing element is configured as an articulated bearing element or a spherical bearing element having at least one rotation axis, or as a shaft element.

In one advantageous design embodiment the position sensor and the position transducer have the same radial spacing from the rotation axis of the bearing element.

In a further advantageous design embodiment the position sensor and the position transducer are mutually disposed in a radial manner in relation to the rotation axis of the bearing element.

The bearing element is advantageously integrated in a holder for fastening the housing.

In a further embodiment the bearing element and the housing form an integral design. It is guaranteed on account thereof that no sealing is required between the bearing element and the housing.

In one advantageous embodiment the position sensor or the position transducer is capable of being integrated in the bearing element, in the movement sensor, or in the separate housing module by insert molding. This enables a simple and cost-effective production.

The position sensor preferably comprises a magnetoresistive sensor, a Hall sensor, or an inductive sensor. These types of sensor are particularly suitable for measuring angles in such a sensor arrangement.

In one advantageous embodiment the position transducer comprises an encoder magnet.

In a further advantageous embodiment the position sensor includes a support magnet.

In this case, the position transducer preferably comprises an encoder plate. The production and the assembly of the sensor arrangement is simplified by way of this embodiment.

In one advantageous embodiment the movement sensor is part of a gearbox which converts a substantially linear movement into a substantially rotary movement.

It is expedient for the movement sensor to be configured as lever rod.

It is advantageous herein for the lever rod to be rotatably coupled to a coupling rod.

BRIEF DESCRIPTION OF THE DRAWINGS

Exemplary embodiments of the invention are illustrated in the drawings and will be explained in more detail hereafter. In the figures:

FIG. 5 shows an external view of a fourth exemplary embodiment of a sensor arrangement according to the invention; and.

DETAILED DESCRIPTION OF THE PREFERRED EMBODIMENTS

Figure 2:
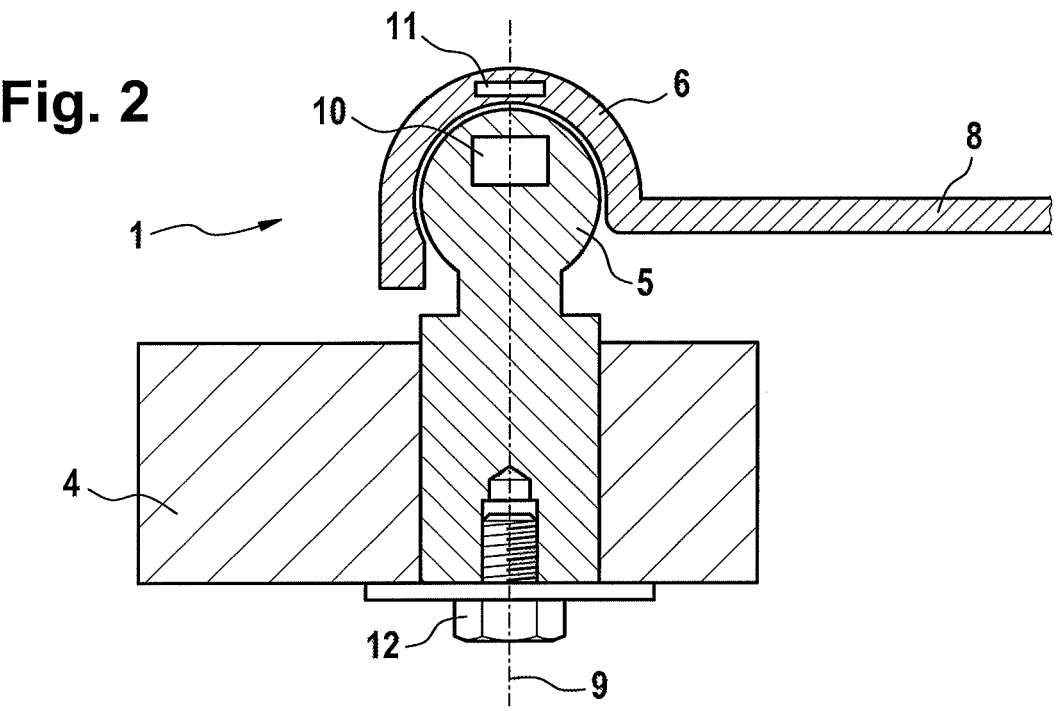
FIG. 2 shows a schematic sectional view of a sensor arrangement according to the invention in an integrated embodiment.

FIG. 2 schematically shows a first exemplary embodiment of a sensor arrangement 1 according to an aspect of the invention in a sectional view, comprising a movement sensor 8, a housing 4, a bearing element 5 which in relation to the housing 4 is static, and a position transducer 11 and a position sensor 10, wherein said position transducer 11 and position sensor 10 are mutually disposed in such a manner that the movement of the movement sensor 8 is measurable.

The housing 4 by way of a fastening element 12 is fixedly connected to the bearing element 5 such that the latter conjointly with the housing 4 forms an immovable unit. However, an integrated or integral mode of the housing 4 and of the bearing element 5 without the fastening element 12 would likewise be conceivable. Moreover, the bearing element 5 is configured so as to project from the housing 4 such that the region in which the movement sensor 8 is mounted lies outside the housing 4. That end of the bearing element 5 that projects from the housing 4 is configured so as to be spherical and restricts the movement potential of the movement sensor 8 such that the latter is rotatable in a limited manner about axes which intersect the center of the spherical configuration. The housing 4 and the movement sensor 8 herein are shaped or mutually spaced apart, respectively, such that every movement of the movement sensor 8 that is defined as permissible is enabled. The intention herein is primarily to detect an angle of rotation about the rotation axis 9 illustrated, while other angles of rotation, depending on the embodiment of the position sensor 10, are either not detected or are likewise detected and used for a mathematical resolution or for estimating wear.

Movement sensor 8 has a counterpart 6 in the manner of a hollow sphere, corresponding to a joint socket. The ball joint thus formed forms the mounting of the movement sensor 8 on the housing 4. The position transducer 11 is integrated in the movement sensor 8 or in the joint socket, respectively, such that said position transducer 11 can describe the angles of rotation of the movement sensor 8. The position sensor 10 that is integrated in the bearing element 5 or in the spherical configuration of the latter, respectively, is configured and positioned such that said position sensor 10 detects the angles of rotation. Swapping the position transducer 11 and the position sensor 10 would likewise be possible. When the movement sensor 8 is rotated, for example as a consequence of a displacement of a coupling rod about the rotation axis 9 illustrated, the position transducer 11 is then conjointly rotated. By virtue of the rotated position thereof, the position sensor 10 receives modified information pertaining to the angle, for example by way of a rotated magnetic field, said information being transferred by way of an electrical line (not illustrated here) to an evaluation unit (likewise not illustrated).

Figure 3:
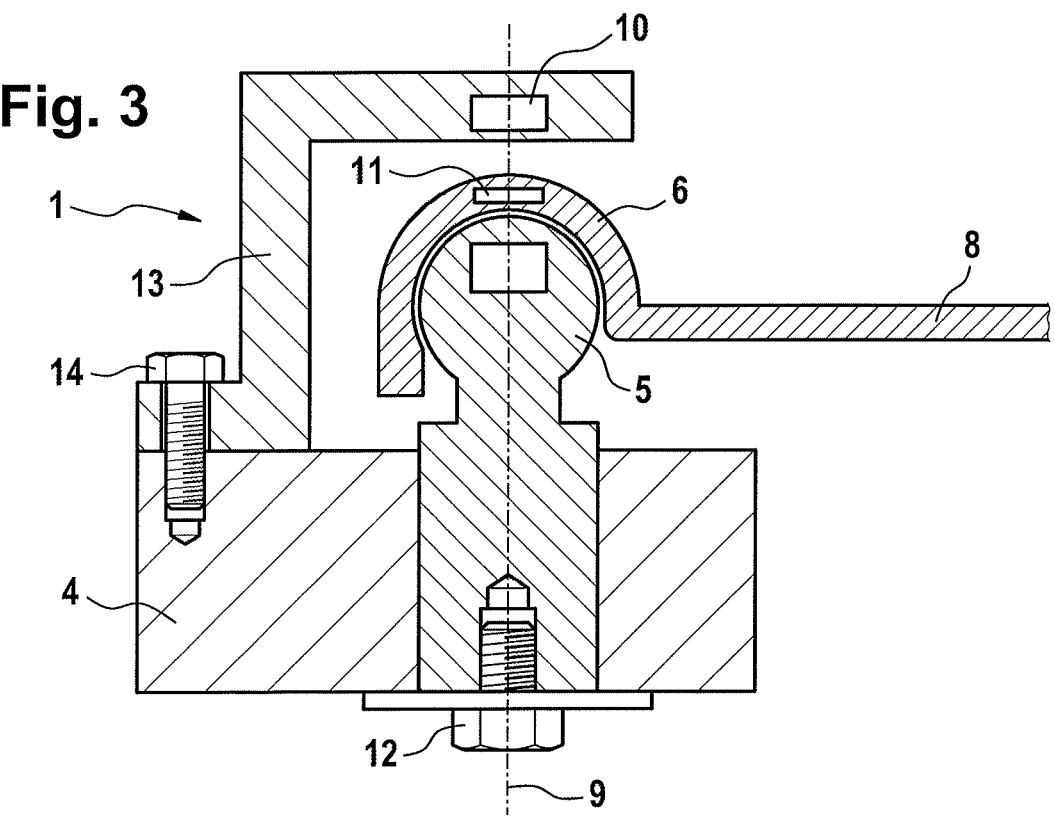
FIG. 3 shows a schematic sectional view of a sensor arrangement according to the invention in a modular embodiment.

FIG. 3 shows a sectional view of a modular mode of a sensor assembly 1 according to an aspect of the invention, according to a second exemplary embodiment. Said second exemplary embodiment apart from a movement sensor 8, a housing 4, a bearing element 5, and a position transducer 11, and a position sensor 10, also comprises a housing module 13 which by way of a housing module fastening element 14 is connected to the housing 4 and conjointly with the latter forms a static unit. The position sensor 10 and the position transducer 11 are mutually disposed in such a manner that the movement of the movement sensor 8 is measurable. The features relating to the arrangement of the bearing element 5 and of the movement sensor 8 are identical to those of FIG. 2 and are therefore not repeated.

By contrast to FIG. 2, the position sensor 10 is however not integrated in the bearing element 5 but in the housing module 13. This housing module 13 is configured such that the movement sensor 8 has sufficient space for a permissible rotating movement and that an undesirable release of the movement sensor 8 from the bearing element 5, in particular along the rotation axis 9 of the latter, is prevented. The position transducer 11 is integrated in the movement sensor 8. By assigning the position sensor 10 to the housing module 13, and the position transducer 11 to the movement sensor 8, a modular component concept is implemented in the case of this arrangement. However, a reversed assignment would be likewise conceivable. Apart from the detection of the angle of rotation of the movement sensor 8 about the longitudinal axis of the bearing element 5, a detection of angles of rotation about other axes is also possible by using a 3D sensor element, for example a Hall sensor element, as the position sensor 10. In this way, a conclusion about wear to the mounting can be drawn, or the result of a specific detection of an angle can be resolved with the aid of an evaluation unit (not illustrated).

Figure 4:
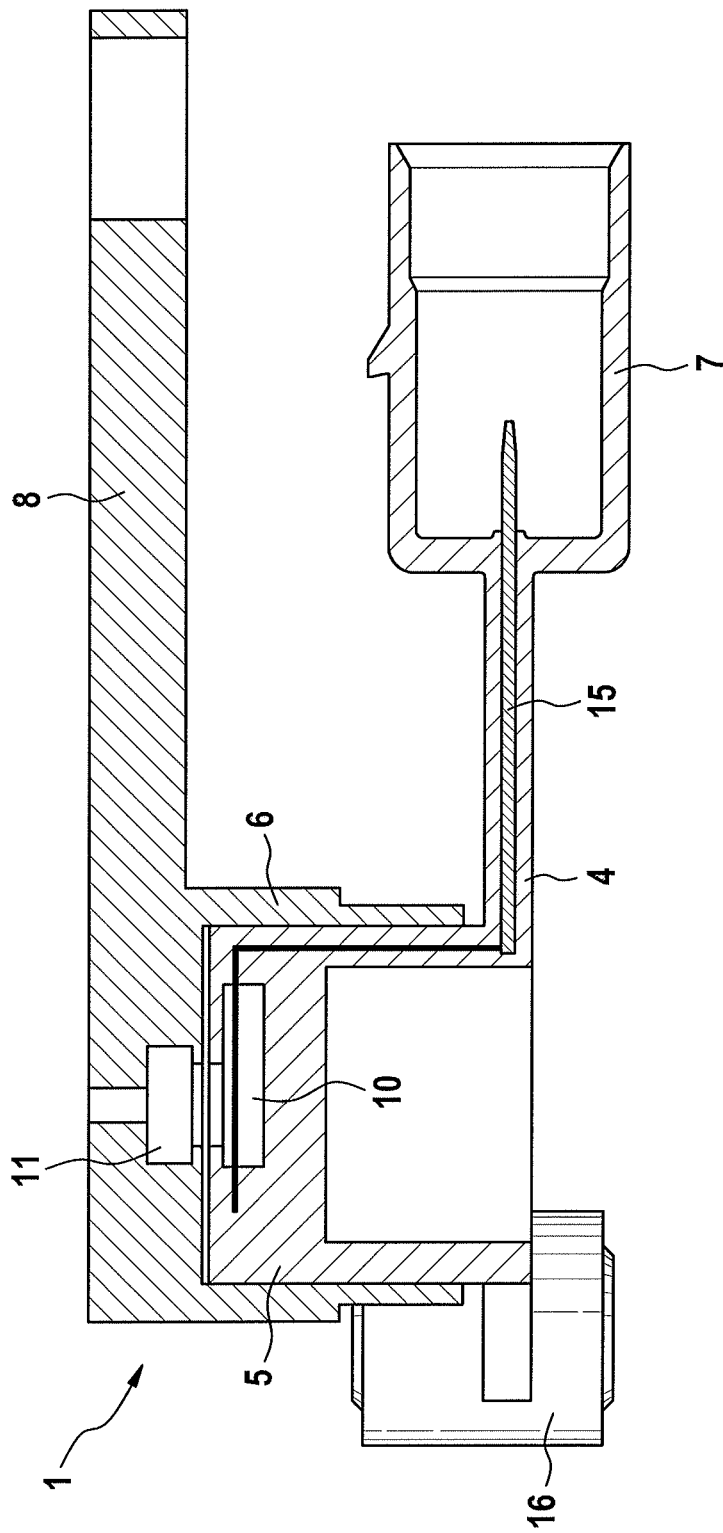
FIG. 4 shows a sectional view of a third exemplary embodiment of a sensor arrangement according to the invention.

FIG. 4 in a further sectional view shows a sensor arrangement 1 according to a aspect of the invention, according to a third exemplary embodiment. A repeat of the description of identical features of the preceding figures is dispensed with.

The bearing element 5 here is embodied so as to be cylindrical and includes the integrated position sensor 10 which by way of an electrical line 15 is connected to evaluation electronics (not illustrated) in a container region 7 of the housing 4. Said bearing element 5, in contrast to what is shown the embodiments of FIG. 3 and FIG. 4, is connected to the housing 4 not by way of a fastening element but in an integrated manner. The bearing element 5 conjointly with the correspondingly shaped counterpart 6 of the movement sensor 8 forms part of an articulated bearing which restricts the movement sensor 8 substantially to one degree of freedom, the rotation about the longitudinal axis of the cylindrical bearing element 5. The position transducer 11 is aligned on this rotation axis and is integrated in the movement sensor 8.

The housing at one end includes a fastening molding 16 which serves for fastening the housing 4 to a part of the vehicle body by means of a suitable fastening element. A narrow region which routes the electrical line 15 of the position sensor 10 to the container region 7 having the evaluation electronics (not illustrated) adjoins the bearing element 5 that is configured in an integrated manner.

Figure 1A:
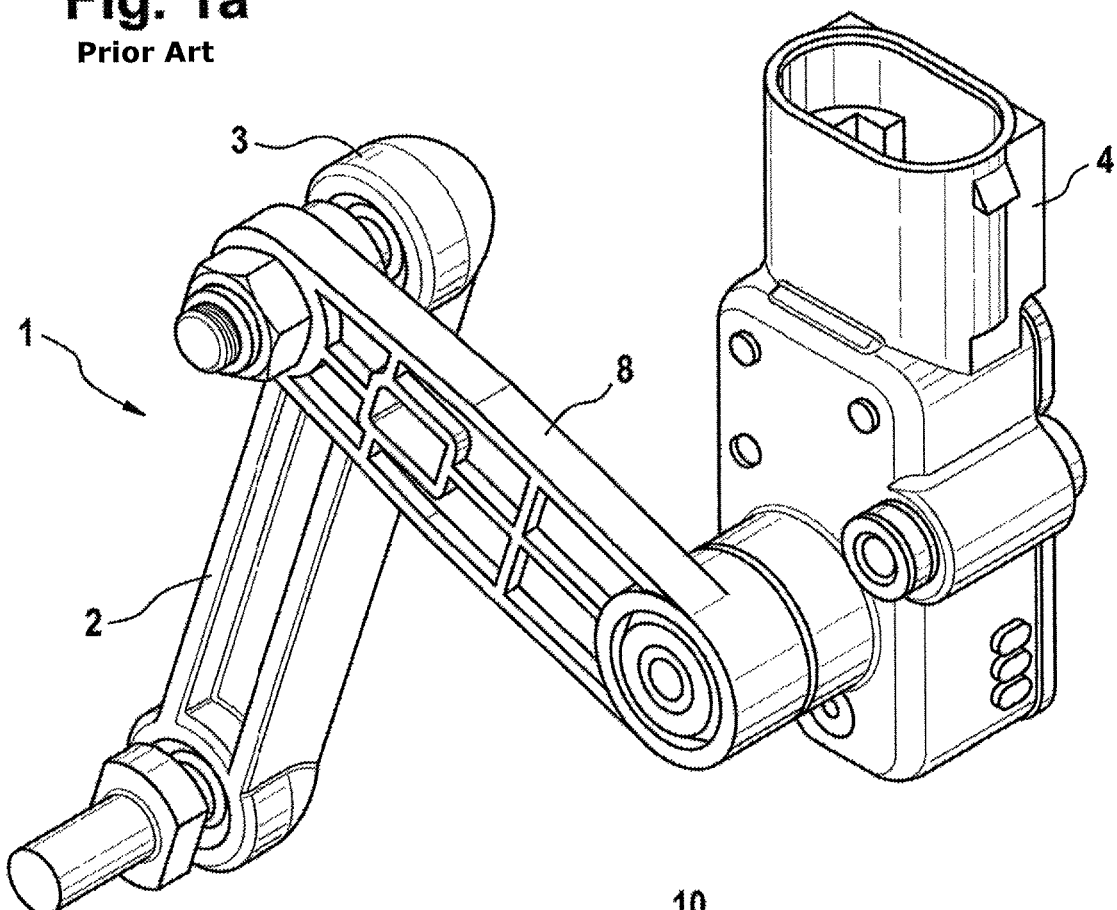
FIGS. 1a and 1b show a prior art sensor arrangement.
Figure 1B:
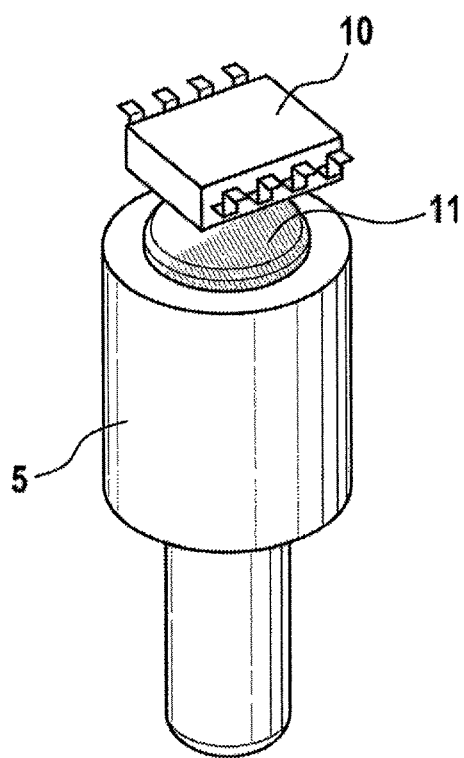
Figure 5:
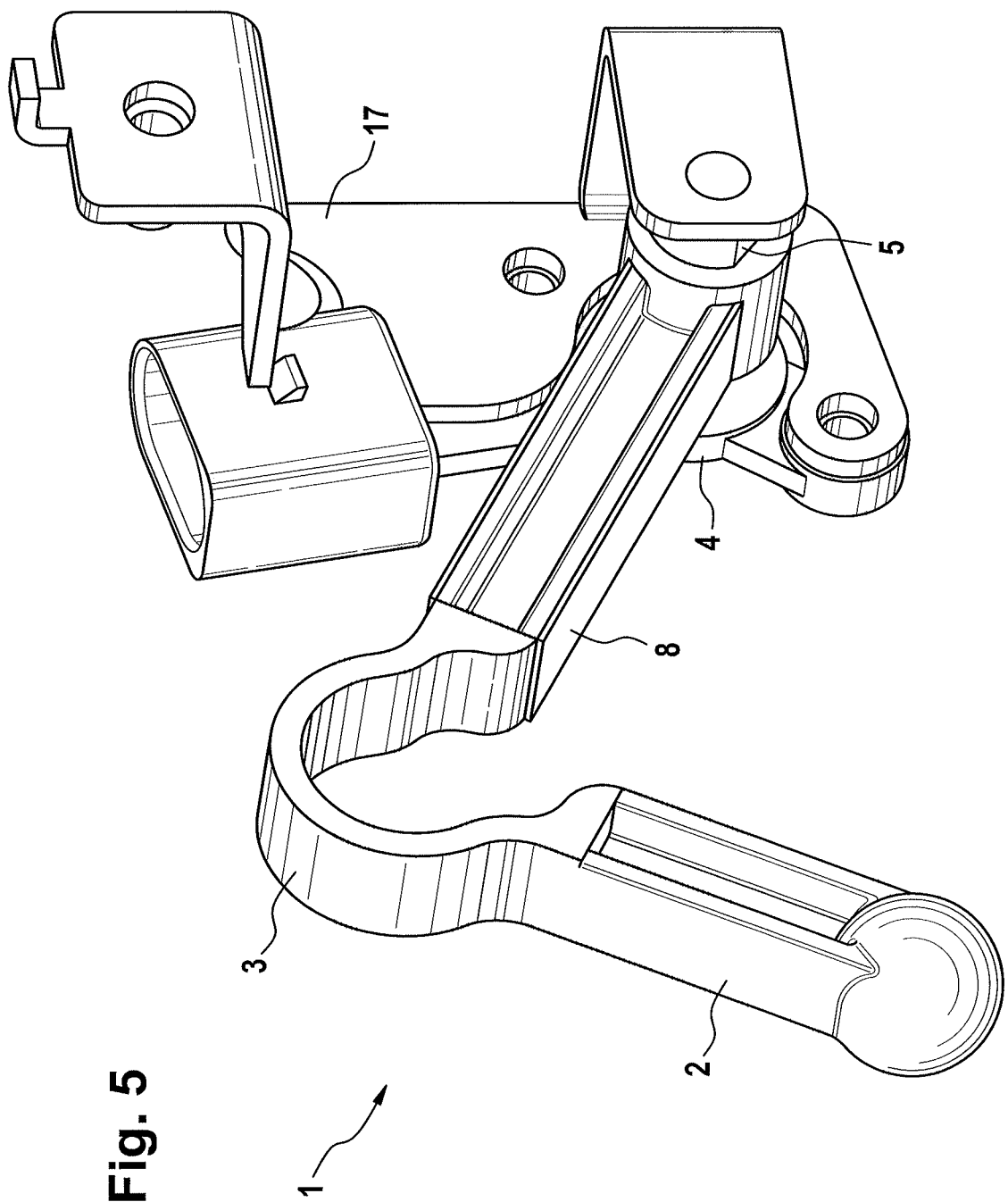

FIG. 5 in a further embodiment shows a sensor arrangement 1 according to an aspect of the invention in the integrated mode according to a fourth exemplary embodiment. A repeat of the description of identical features of the preceding figures is dispensed with also here. The movement sensor 8 by way of an elastically deformable joint part made of plastic is connected to a displaceable coupling rod 2, so as to detect displacements of a vehicle component (not illustrated). The elastic joint part forms the coupling joint 3 and is capable of converting a displacement of the coupling rod 2 into a rotation of the movement sensor 8, while dispensing with a multi-part joint as illustrated in FIG. 1*a*. The bearing element 5 in the case of this embodiment is connected to a holder 17 for fastening the housing 4 to a vehicle part. The position sensor and the position transducer are obscured in this illustration. Said position sensor and position transducer are integrated in the housing 4 or in the movement sensor 8, respectively.

Figure 6:
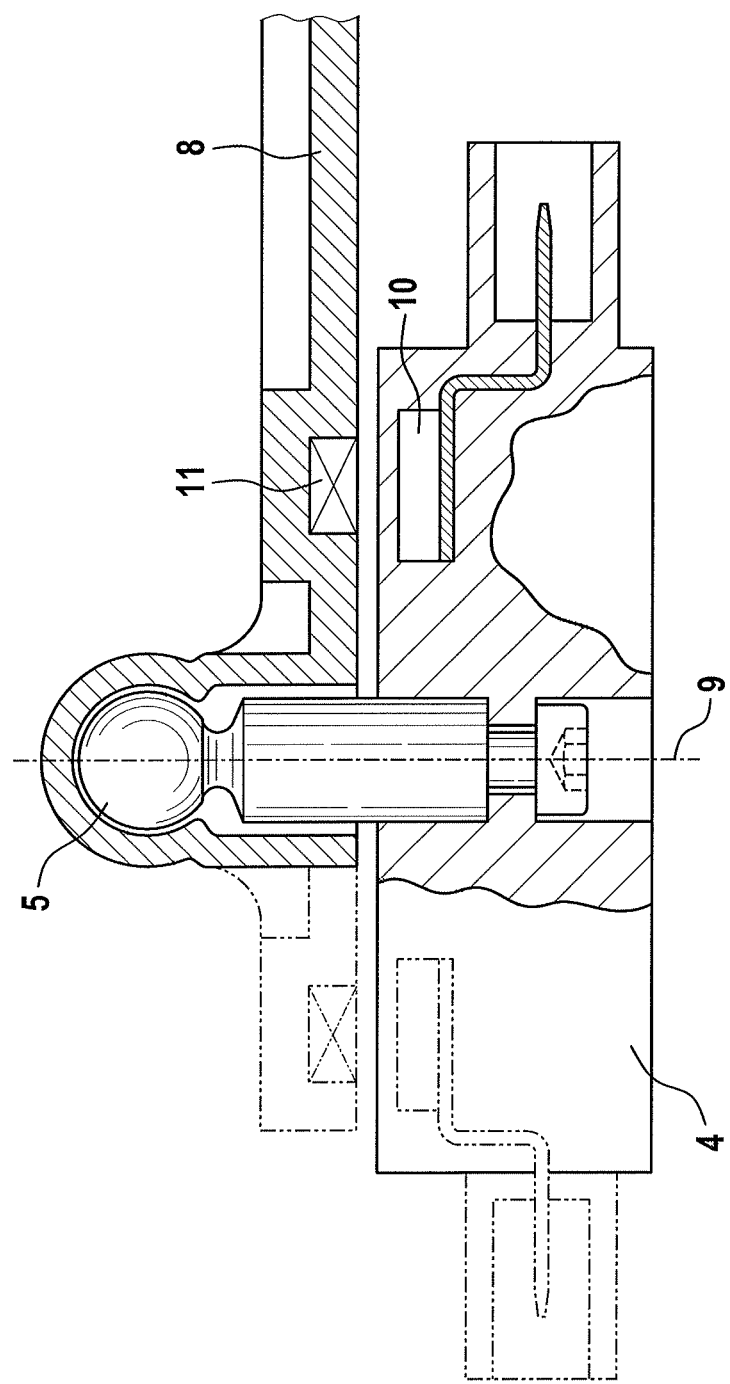
FIG. 6 shows a schematic sectional view of a fifth exemplary embodiment of a sensor arrangement according to the invention.

The sectional view of an integrated mode of a sensor arrangement according to an aspect of the invention, according to a fifth exemplary embodiment, shown in FIG. 6, apart from components that have already been described above, such as the movement sensor 8, the bearing element 5, and the housing 4, a repeat of the description thereof being dispensed with, comprises a position sensor 10 and a position transducer 11, each of the latter being radially spaced apart from the rotation axis of the movement sensor 8. Position sensor 10 and position transducer 11 are configured so as to be annular; however an embodiment of the position sensor 10 and/or of the position transducer 11 in the manner of segments of a circle or in multiple parts would also be conceivable. Alternatively or additionally, instead of the arrangement shown in which the position sensor 10 and the position transducer 11 are parallel to the rotation axis 9, an arrangement in which they are radial in relation to the rotation axis 9 is also possible.

All the features that have been explained and shown in the context of individual embodiments of the invention can be provided in various combinations in the subject matter according to the invention in order for the advantageous effects of said features to be implemented simultaneously.

The scope of protection of the present invention is defined by the claims and is not limited by the features explained in the description or shown in the figures.

LIST OF REFERENCE SIGNS

1. Sensor arrangement
2. Coupling rod
3. Coupling joint
4. Housing
5. Bearing element
6. Counterpart
7. Container region
8. Movement sensor
9. Rotation axis
10. Position sensor
11. Position transducer
12. Fastening element
13. Housing module
14. Housing module fastening element
15. Electrical line
16. Fastening molding
17. Holder

The invention claimed is:

1. A sensor arrangement comprising:
   a housing,
   a movement sensor, wherein the movement sensor is mounted on a bearing element that is connected to the housing,
   a position sensor, and
   a position transducer,
   wherein the position sensor and the position transducer are mutually disposed in such a manner to enable measurement of the movement of the movement sensor,
   wherein the position sensor or the position transducer is integrated in the housing, and
   wherein the bearing element is configured so as to project from the housing, and is rigidly connected to the housing to prevent rotation of the bearing element relative to the housing,
   wherein the bearing element is configured as a bearing element which restricts the movement sensor to one degree of freedom or a spherical bearing element having at least one rotation axis, and
   wherein the position sensor and the position transducer have a same radial spacing from the rotation axis of the bearing element.

2. The sensor arrangement as claimed in claim 1, wherein the position sensor or the position transducer is integrated in the movement sensor.

3. The sensor arrangement as claimed in claim 1, wherein the position sensor comprises a 3D sensor.

4. The sensor arrangement as claimed in claim 1, wherein the bearing element is integrated in a holder for fastening the housing.

5. The sensor arrangement as claimed in claim 1, wherein the bearing element is configured so as to be substantially spherical or cylindrical.

6. The sensor arrangement as claimed in claim 1, wherein the movement sensor is configured as a shaft.

7. A sensor arrangement comprising:
   a housing,
   a movement sensor, wherein the movement sensor is mounted on a bearing element that is connected to the housing,
   a position sensor,
   a position transducer, and
   a housing module for receiving the position sensor or the position transducer,
   wherein the position sensor and the position transducer are mutually disposed in such a manner to enable measurement of the movement of the movement sensor,
   wherein the bearing element is configured so as to project from the housing, and is rigidly connected to the housing to prevent rotation of the bearing element relative to the housing, and
   wherein the housing module is attached to the housing so as to be aligned on a rotation axis of the bearing element,
   wherein the housing module is configured such that said housing module intersects the rotation axis of the bearing element so close to the movement sensor that an axial removal of the movement sensor from the bearing element is prevented.

8. A sensor arrangement comprising:
a housing,
a movement sensor, wherein the movement sensor is mounted on a bearing element that is connected to the housing,
a position sensor, and
a position transducer,
wherein the position sensor and the position transducer are mutually disposed in such a manner to enable measurement of the movement of the movement sensor,
wherein the position sensor or the position transducer is integrated in the housing, and
wherein
the position sensor and the position transducer are disposed so as to be eccentric in relation to rotation about the bearing element, and
the bearing element is configured so as to project from the housing, and is rigidly connected to the housing to prevent rotation of the bearing element relative to the housing,
wherein the bearing element is configured as a bearing element which restricts the movement sensor to one degree of freedom element or a spherical bearing element having at least one rotation axis, and
wherein the position sensor and the position transducer are radially spaced apart from the rotation axis of the bearing element.

* * * * *